July 18, 1961  D. BERLIN  2,992,854
CHILD'S CHAIR BRACKET SUSPENSION
Filed April 14, 1958  3 Sheets-Sheet 1

INVENTOR.
DANIEL BERLIN
BY Harry Langsam
Stanley Bilker
ATTORNEYS

July 18, 1961  D. BERLIN  2,992,854
CHILD'S CHAIR BRACKET SUSPENSION
Filed April 14, 1958  3 Sheets-Sheet 2
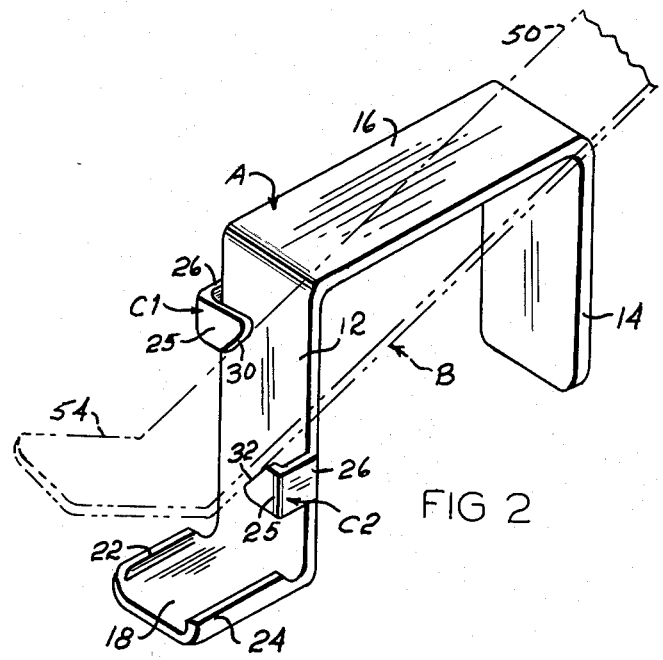
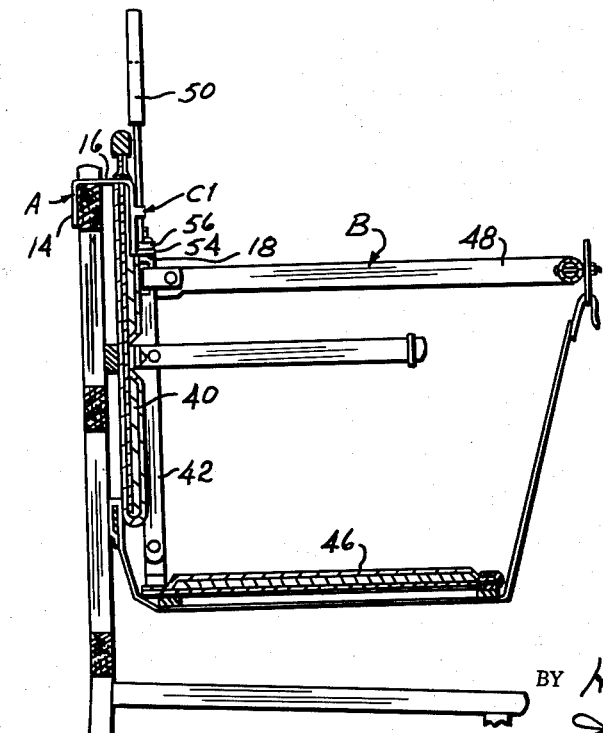
INVENTOR.
DANIEL BERLIN
BY *Harry Langseur*
*Hanley Belker*
ATTORNEYS

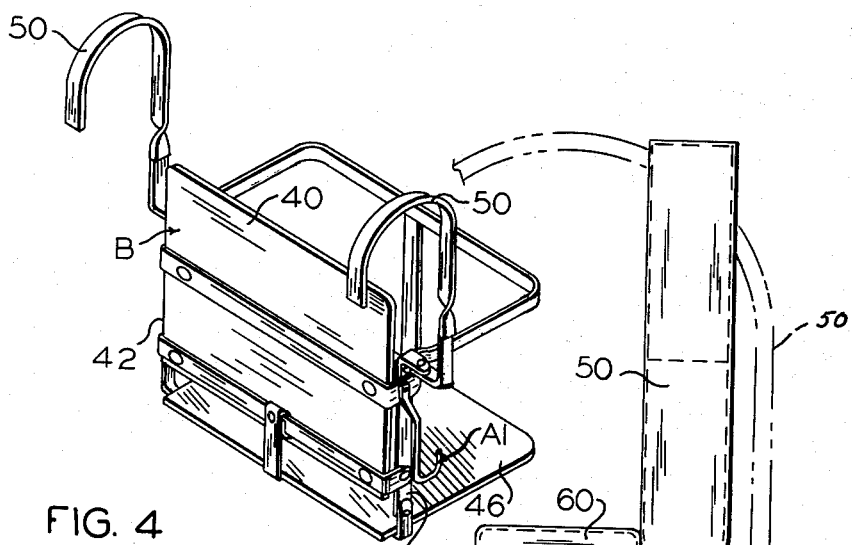
FIG. 4
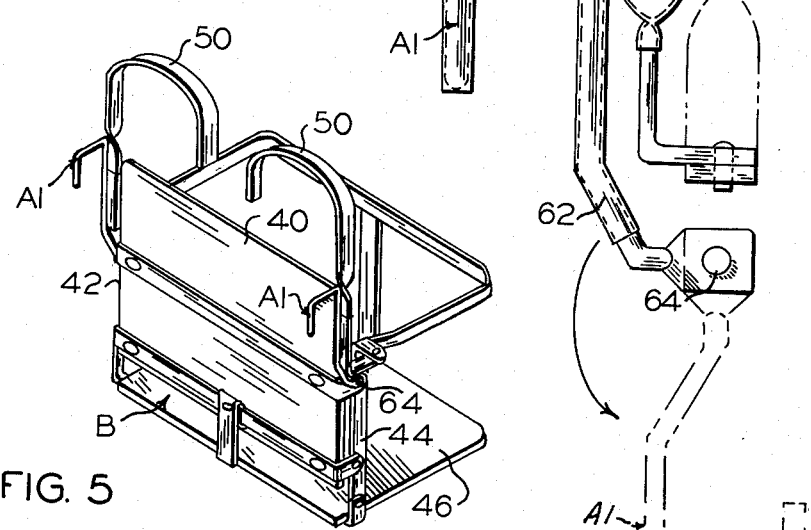
FIG. 5
FIG. 6
INVENTOR.
DANIEL BERLIN
BY 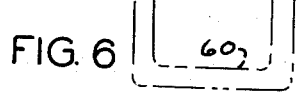
ATTORNEYS

United States Patent Office 2,992,854
Patented July 18, 1961

2,992,854
CHILD'S CHAIR BRACKET SUSPENSION
Daniel Berlin, 4424 Paul St., Philadelphia, Pa.
Filed Apr. 14, 1958, Ser. No. 728,292
2 Claims. (Cl. 297—256)

My invention relates to a child's chair bracket suspension, and more particularly relates to a bracket for suspending the usual auxiliary automobile seat for children firmly and securely upon the back of a house chair.

The usual child's auxiliary automobile seat has a pair of hooks or arms at the rear end thereof for supporting the seat upon the back of an automobile seat. While these hooks or arms are satisfactory for suspending the child's seat within an automobile, the thickness of the back rest of an ordinary kitchen chair is much smaller than the breadth upon which the hooks are to be suspended, thereby providing a very unstable arrangement when it is desired to utilize the auxiliary seat as a high chair for a child.

The invention set forth herein is adapted to support and secure small children from the time that they are just able to sit up upright until they are three or four years old. The invention is further adapted to restrain the child in a sitting or standing position and to provide fairly substantial support for the child, should the child elect to sit down when the seat is in the lowered position either upon the back of an automobile seat or upon a conventional household chair.

It is therefore an object of my invention to provide a bracket for suspending an auxiliary automobile seat for children safely and securely from the back of a conventional household chair.

Another object of my invention is to provide a bracket for suspending from the back of a household chair an auxiliary automobile seat wherein the bracket is detachable and may be removed from the auxiliary seat when it is used in an automobile.

Another object of my invention is to provide a detachable bracket for a child's auxiliary automobile seat wherein the child may be securely supported in a conventional household chair in either a sit-down or stand-up position.

Another object of my invention is to provide a detachable bracket for an auxiliary automobile seat wherein the auxiliary seat may be easily converted for use as a high chair in a house.

Other objects of my invention are to provide an improved device of the character described, which is easily and economically produced, and which is sturdy in construction and highly efficient in operation.

With the above and related objects in view, my invention consists in the details of construction and combination of parts, as will be more fully understood from the following description, when read in conjunction with the accompanying drawings, in which:

FIG. 2 is a perspective view of the bracket suspension for mounting the auxiliary seat upon the back of a household chair.

FIG. 3 is a side view, and partly in section, of the child's auxiliary automobile seat suspended utilizing brackets for suspension from the back of a chair.

FIG. 4 is a back perspective view of an automobile seat having a bracket modification embodying my invention, the bracket modification being in folded position.

FIG. 5 is a back perspective view of the automobile seat with the bracket modification in high chair suspended position.

FIG. 6 is an enlarged perspective view of the bracket modification.

Referring now in greater detail to the drawings in which similar reference characters refer to similar parts, I show a bracket suspension, generally designated as A, for suspending an auxiliary automobile seat, generally designated as B, from the back of a household chair.

Figure 1:
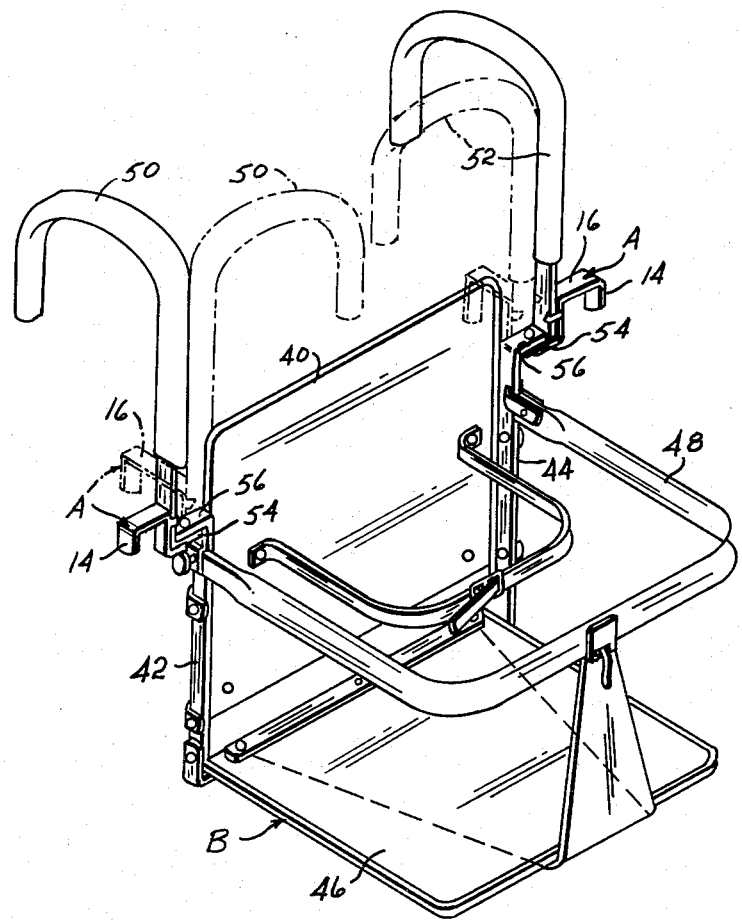
FIG. 1 is a perspective view of a child's auxiliary automobile seat having incorporated therein a bracket suspension embodying my invention.

The bracket A is of metal construction and is substantially U-shaped in configuration having a pair of arms 12 and 14 integrally extending at right angles from a bight portion 16. A leg 18 integrally extends at right angles to the arm 12 and has a pair of upwardly curled edges 22 and 24 projecting upwardly therefrom. A pair of latching fingers C1 and C2 are integrally formed at the sides of the arm 12, each having a tab 25 spaced from the plane of the arm 18 by flanges 26. The fingers C1 and C2 are vertically spaced from each other and the lower portion of the C1 tab is chamfered at 30 and the upper portion of the tab 25 of C2 is chamfered at 32 whereby the angular spacing between the two tabs are sufficient to permit entrance therebetween of a member to be supported. See FIG. 2.

The auxiliary seat B comprises a back rest portion 40 supported intermediate vertical inverted-L-leg members 42 and 44. The lower portion of the legs 42 and 44 have a seat portion 46 which is pivotally secured therebetween and adapted to be supported either in a horizontal or vertical position for use as a seat or a stand support respectively. A U-shaped restraining bar 48 is secured at the upper portion of the legs for maintaining the child either in a sitting or standing position. A pair of hook members 50 and 52 are pivotally secured upon the angle portion of the legs 42 and 44 respectively and are adapted to support the auxiliary seat upon the back portion of a conventional automobile seat. It is to be observed that each of the hooks 50 and 52 have a lower lip portion 54 which is adapted to be in abutment and pivotally secured to the angle portion 56 of the vertical leg members 42 and 44 respectively.

As is apparent from the foregoing description, my invention is used in the following manner: Referring to FIG. 1, the seat is adapted to be used on the back of an automobile by employing the hooks 50 and 52 (solid lines) at right angles to the plane of the back rest portion 40. When the seat B is used as a high chair, the arms 50 and 52 are rotated inwardly (broken lines) substantially coplanar with the back rest portion 40. The bracket suspension A is mounted upon the hook 50 or 52 by turning the bracket until the leg portion of the hooks fit intermediate the surfaces 30 and 32 of the tabs 25 of the fingers C1 and C2 respectively. The bracket A is then rotated until the leg portion of the hooks is substantially aligned with the arm 12 and the lip 54 sits in the leg 18 intermediate the upwardly projecting edges 22 and 24 respectively. By hooking the bight portion 16 upon the back of a chair, it is easily seen that the auxiliary automobile seat is convertible into a high chair and securely supported for maintaining the child securely in position either in a sitting or standing position.

In FIGS. 4, 5 and 6, I show a bracket modification A1 which is permanently affixed to and pivotally mounted upon the side frames of the automobile seat whereby the automobile seat B may be converted into a high chair simply by rotating the bracket members A1 from their downward position, as shown in FIG. 4, into an upward position as shown in FIG. 5. The bracket modification A1 comprises a hook member 60 integrally extending from a leg portion 62, the leg being pivotally mounted at 64 to the side frames 42 and 44. Thus each of the bracket members A1 are permanently affixed to and pivotally mounted upon the seat A and are not detachable therefrom. When the chair is used as an auxiliary automobile seat the bracket members are swung downwardly into a position shown in FIG. 4 whereas the hook members 50 and 52 are swung into planes perpendicular to the back 40 of the car seat. When it is desired to convert the seat into a high chair, the hook suspending members 50 and 52 are swung inwardly in a plane substantially in alignment with the back rest 40, and the bracket suspensions A1 are rotated upwardly into a position shown in FIG. 5. It is to be noted that when the bracket members are swung upwardly, the portion of the bracket members intermediate the hook 60 and the leg portion 62 are in abutment with the lower portion of the hook members 50 and 52 maintaining the hook members locked in a plane parallel to and in alignment with the back rest portion 40.

Although my invention has been described in considerable detail, such description is intended as being illustrative rather than limiting, since the invention may be variously embodied, and the scope of the invention is to be determined as claimed.

I claim:

1. A bracket for suspending an auxiliary child's automobile seat upon a chair for conversion of the chair into a high chair, said child's automobile seat including hooks to suspend the child's seat upon the back portion of an automobile seat, said bracket comprising a U-shaped member having a pair of parallel arms extending substantially at right angles to a bight portion, a pair of supporting fingers on the edges of one of said arms and having tab portions spaced from said arm and spaced from each other, a leg extending substantially at right angles to said arm whereby the lower portion of one of said hooks is adapted to be supported upon said leg and secured thereto by said pair of supporting fingers.

2. A bracket comprising a first pair of bracket arms and a second pair of bracket arms, said first pair of bracket arms each including an arcuate upper portion and a lower portion extending therefrom, said second pair of bracket arms each comprising a U-shaped member having a pair of parallel arms extending substantially at right angles to a bight portion, a pair of supporting fingers on the edges of one of said arms and having tab portions spaced from said arm and spaced from each other, a leg extending substantially at right angles to said arm whereby the lower portion of one of said first pair of bracket arms is supported on said leg and secured thereto by said pair of fingers so that said first pair of bracket arms are positioned substantially at right angles to said second pair of bracket arms whereby when said first pair of bracket arms are rotated inwardly said second pair of bracket arms will be disposed in a position to engage the back-rest portion of a chair.

References Cited in the file of this patent

UNITED STATES PATENTS

| | | |
|---|---|---|
| 587,864 | Weber | Aug. 10, 1897 |
| 1,039,759 | Knight | Oct. 1, 1912 |
| 1,853,848 | Cross | Apr. 12, 1932 |
| 2,530,136 | Van Steen Brugghe | Nov. 14, 1950 |
| 2,570,365 | Michael et al. | Oct. 9, 1951 |
| 2,721,603 | Faulconer | Oct. 25, 1955 |

FOREIGN PATENTS

| | | |
|---|---|---|
| 489,128 | Great Britain | July 20, 1938 |